Patented Jan. 6, 1948

2,434,179

UNITED STATES PATENT OFFICE 2,434,179

HYDROXYALKYL ETHERS OF HYDROXYLATED INTERPOLYMERS AND THEIR PREPARATION

William H. Sharkey, Wilmington, Del., assignor to E. I. du Pont de Nemours & Company, Wilmington, Del., a corporation of Delaware No Drawing. Application November 30, 1943, Serial No. 512,335

7 Claims. (Cl. 260—90)

This invention relates to new compositions of matter and more particularly to ethers of hydrolyzed interpolymers of ethylene with vinyl organic esters and to processes for preparing such ethers.

Polymeric alcohols derived by the hydrolysis of interpolymers of ethylene with a vinyl organic ester differ from polyvinyl alcohol in important respects, particularly in being water-insoluble. In many applications, notably in the preparation of fibers and pellicles which are to be subjected to aqueous media, this property of water-insolubility is an important factor which serves to render polymeric alcohols derived by the hydrolysis of said interpolymers more desirable than the commercially available polyvinyl alcohol. However, their water-insolubility renders their application from solution difficult for the reason that to obtain and use solutions thereof one must handle and recover large volumes of expensive non-aqueous solvents. Furthermore, for certain applications, for example, as sizes, tanning agents, detergents, emulsifying agents, laundry assistants and plasticizers, the water-insolubility of said hydrolyzed interpolymers is an obvious disadvantage.

It has now been discovered that certain hydrolyzed interpolymers obtained by hydrolyzing an interpolymer of ethylene with a vinyl organic ester may be etherified by selected etherifying agents to provide ethers of said hydrolyzed interpolymers which are water-soluble. Accordingly, this invention has as an object the provision of water-soluble derivatives of hydrolyzed interpolymers of ethylene with vinyl organic esters. Another object is to provide a simple and inexpensive process for producing derivatives of said hydrolyzed interpolymers. Still another object is to provide water-soluble derivatives of said hydrolyzed interpolymers for use in film-forming compositions. It is also among the particular objects of this invention: to provide water-soluble derivatives of said hydrolyzed interpolymers adapted for use in film form as wrapping foils; to provide water-soluble derivatives of said hydrolyzed interpolymers adapted for use as sizes for textile fibers and paper and as tanning agents; and to provide water-soluble derivatives of said hydrolyzed interpolymers adapted for use as detergents, as emulsifying agents, as assistants for aliphatic sulfonates in laundering and as plasticizers for cellulose acetate. Additional objects will become apparent from an examination of the following description and claims.

These and other objects and advantages are accomplished by the herein described invention which broadly comprises admixing a hydrolyzed interpolymer of ethylene and a vinyl ester of an organic carboxylic acid with an alkylene oxide containing not more than 6 carbon atoms and having the general formula

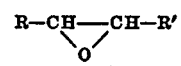

wherein R and R' are radicals selected from the group consisting of hydrogen atoms and monovalent alkyl, hydroxy alkyl, and halogen alkyl radicals containing not more than 4 carbon atoms.

In a more restricted sense this invention comprises admixing, at a temperature within the range of from 50° C. to 200° C., an alkylene oxide containing not more than 6 carbon atoms and having the general formula

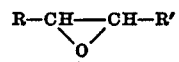

wherein R and R' are radicals selected from the group consisting of hydrogen atoms and monovalent alkyl, hydroxy alkyl and halogen alkyl radicals containing not more than 4 carbon atoms, with a hydrolyzed interpolymer of ethylene and a vinyl ester of an organic carboxylic acid, said hydrolyzed interpolymer being that had by replacing by hydroxyl groups at least 50% of the ester groups of an interpolymer of ethylene and a vinyl ester of an organic carboxylic acid in which the mol ratio of ethylene to vinyl ester is within the range of from 1/25 to 8/1.

One preferred embodiment of the invention comprises admixing ethylene oxide, and from 0.2% to 0.5% sodium hydroxide based on the weight of the ethylene oxide, with a hydrolyzed interpolymer of ethylene and vinyl acetate at a temperature within the range of from 50° C. to 120° C., said hydrolyzed interpolymer being that had by replacing by hydroxyl groups at least 95% of the acetate groups of an interpolymer of ethylene and vinyl acetate in which the mol ratio of ethylene to vinyl acetate is within the range of from 1/25 to 8/1.

The novel products of this invention are hydroxyalkyl ethers of hydrolyzed interpolymers of ethylene and a vinyl ester of an organic carboxylic acid, said ethers being those had by replacing hydroxyl groups of said hydrolyzed interpolymers by radicals having the general formula

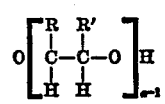

in which R and R' are radicals selected from the group consisting of hydrogen atoms and monovalent alkyl, hydroxyl alkyl and halogen alkyl radicals containing not more than 4 carbon atoms, $a-1$ is a positive integer and each

unit contains not more than 6 carbon atoms.

In a more restricted sense the product of this invention is a water-soluble hydroxyalkyl ether of a hydrolyzed interpolymer of ethylene and a vinyl ester of an organic carboxylic acid, said ether being that had by replacing by hydroxyl groups at least 50% of the ester groups of an interpolymer of ethylene and a vinyl ester of an organic carboxylic acid in which the mol ratio of ethylene to vinyl ester is within the range of from 1/25 to 8/1, and replacing the hydroxyl groups of the resultant hydrolyzed interpolymer by radicals having the general formula

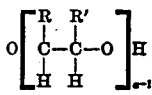

wherein R and R' are radicals selected from the group consisting of hydrogen atoms and monovalent alkyl, hydroxy alkyl, and halogen alkyl radicals containing not more than 4 carbon atoms, each

unit contains not more than 6 carbon atoms, and $a$ is a positive integer, the average value of $a-1$ being a positive number within the range of from 1 to 30.

A preferred product is a water-soluble hydroxyalkyl ether of a hydrolyzed interpolymer of ethylene and vinyl acetate, said ether being that had by replacing by hydroxyl groups at least 50% of the acetate groups of an interpolymer of ethylene and vinyl acetate in which the mol ratio of ethylene to vinyl acetate is within the range of from 1/25 to 8/1, and replacing the hydroxyl groups of the resultant hydrolyzed interpolymer by radicals having the general formula $$O(CH_2CH_2O)_{a-1}H$$

wherein $a$ is a positive integer, the average value of $a-1$ being a positive number within the range of from 1 to 30.

The expression "vinyl organic ester" as employed herein refers to a vinyl ester of an organic carboxylic acid.

Interpolymers of ethylene with a vinyl organic ester useful in this invention, their preparation and the hydrolysis of said interpolymers are described in detail in copending U. S. application Serial No. 446,114, filed June 6, 1942, now abandoned.

Interpolymers of ethylene and a vinyl organic ester useful in this invention are those which are soluble in alcohol or in alcohol-toluene mixtures. Said interpolymers can be prepared most advantageously by copolymerizing ethylene and a vinyl organic ester, for example vinyl acetate, at temperatures of about 100° C. at an ethylene pressure ordinarily below 500 atmospheres in the presence of a peroxygen catalyst. Hydrolysis or alcoholysis of the ethylene/vinyl ester interpolymers may be effected by dissolving the interpolymer in an alcohol such as methanol or ethanol, or in a mixture of an alcohol and a hydrocarbon such as toluene, and then treating with a suitable hydrolyzing agent or catalyst such as alkali or mineral acid. The hydrolysis may be partial or complete, depending on the nature of the solvent, the amount and kind of catalyst used, and the time and temperature of reaction. The following general principles apply: (1) The greater the amount of vinyl ester in the interpolymer, the more rapid the rate of hydrolysis; (2) alkali hydrolyzing agents give more rapid rates of hydrolysis than mineral acid catalysts.

The term "hydrolysis" as used herein and in the accompanying claims is intended to include alcoholysis as well as hydrolysis with the use of water. Regardless of whether water or an alcohol is used to split off the ester groups in the interpolymer, the product is the same.

Complete hydrolysis can be obtained in most cases by dissolving the interpolymer in alcohol or alcohol-toluene to give about a 10% solution, adding an excess of sodium or potassium hydroxide in alcohol and refluxing for about one hour. Those interpolymers having a mole ratio of vinyl ester to ethylene not greater than 2:1 will remain in solution throughout the process. Interpolymers having higher vinyl ester contents become insoluble in the reaction mixture as hydrolysis proceeds. The hydrolyzed products can be separated from the solvent by steam distillation or, if insoluble, by simple filtration. Completely hydrolyzed products thus obtained can be pressed between heated plates or cast from suitable solvents to give films. Such films are much stiffer and tougher than films from the unhydrolyzed interpolymer and generally also have much higher softening temperatures. These films are all insoluble in water. They are thus much less water-sensitive than polyvinyl alcohol films. However, they still retain the characteristic resistance of polyvinyl alcohol to hydrocarbons and other organic solvents.

In many instances it is desirable to stop the hydrolysis short of completion. The hydrolysis can be controlled so that it proceeds to the extent of only 80–95%, i. e. until 80–95% of the ester groups have been replaced by hydroxyl groups. This control can be accomplished by such expedients as using an acid catalyzed alcoholysis with sulfuric acid and ethyl or methyl alcohol, or using less than the theoretical amount of caustic, or controlling the time and temperature of reaction suitably. The exact conditions to use to obtain a given degree of hydrolysis will, of course, vary with the vinyl ester content of the interpolymer used.

Both the partially and completely hydrolyzed products can be converted into fibers by melt or solvent spinning. Although it has proved impossible to melt spin polyvinyl alcohol, the polyalcohols of this invention containing as little as 10% by weight of ethylene can be readily melt spun. In addition, many of the hydrolyzed interpolymers can be spun from a solution in an organic solvent, such as alcohol.

Hydroxyalkyl ethers of hydrolyzed ethylene/vinyl ester interpolymers, formed by the use of a volatile etherifying agent, are best prepared in a pressure vessel. In a preferred method, the reaction between the hydrolyzed interpolymer and the alkylene oxide is carried out by placing the hydrolyzed interpolymer in a pressure vessel together with excess alkylene oxide and a small amount of an aqueous sodium hydroxide solution; e. g., a total of 0.2–0.5% of sodium hydroxide, based on the weight of the alkylene oxide, may be employed. The pressure vessel is heated for about 24 hours at 100–120° C. with constant agitation. At the end of that time the pressure vessel is allowed to cool to room temperature and opened. It contains hydroxyalkyl ether of the hydrolyzed ethylene/vinyl ester interpolymer varying in appearance from a viscous liquid to a cheesy solid depending upon the composition of the original hydrolyzed interpolymer and the extent of reaction. It may be purified by dialysis of its aqueous solution followed by evaporation to recover the pure hydroxyalkyl ether of the hydrolyzed ethylene/vinyl ester interpolymer.

The following examples are given for illustrative purposes and are not intended to place any restrictions or limitations on the herein described invention. Proportions are given in parts by weight, unless otherwise specified.

*Example I*

This example illustrates the preparation of a hydroxyalkyl ether of hydrolyzed 1.3/1 ethylene/vinyl acetate interpolymer.

In a pressure vessel is placed 15 parts of hydrolyzed 1.3/1 ethylene/vinyl acetate interpolymer, 80 parts of ethylene oxide, and 1 part of 30% aqueous sodium hydroxide. The pressure vessel is closed and heated to 120° C. for 24 hours with agitation. Upon cooling and opening of the vessel, 96 parts of a dark viscous ether is obtained which has 10 molecules of ethylene oxide combined per hydroxyl group of the hydrolyzed ethylene/vinyl acetate interpolymer. Aqueous solutions of this composition wet sulfur, stabilize benzene emulsions, and have laundering action. The compound can be employed directly as a detergent, a textile size, as an assistant for long chain sulfonates in laundering, and as a plasticizer for cellulose acetate. In the event that the small percentage of alkali present is harmful for its intended use, e. g., in laundering delicate textile fabrics, purification can be carried out by dialysis of its water solution followed by evaporation of the water.

*Example II*

This example illustrates the preparation of a hydroxyalkyl ether of hydrolyzed 7.8/1 ethylene/vinyl acetate interpolymer.

A reactor is charged with 14 parts of hydrolyzed 7.8/1 ethylene/vinyl acetate interpolymer, 70 parts of ethylene oxide, and 1 part of 30% sodium hydroxide solution. The reactor is closed and heated to 100° C. for 24 hours with constant agitation. At the end of that time the vessel is cooled to room temperature and opened. Eighty-three parts of a brown, cheesy polymer is obtained which softens at 30–35° C. This hydroxyalkyl ether has an average of 20 molecules of ethylene oxide combined with the hydroxyl groups. Although his hydroxyalkyl ether of hydrolyzed 7.8/1 ethylene/vinyl acetate interpolymer is difficultly soluble in water, its aqueous solutions wet sulfur, and can be used as a detergent or textile size. The water-soluble fraction may be purified as is described in Example I.

While this invention has been illustrated with specific reference to water-soluble ethers of hydrolyzed ethylene/vinyl acetate interpolymers, it is of course not so limited but applies broadly to water-soluble ethers of hydrolyzed interpolymers of ethylene with any vinyl organic ester, such as vinyl acetate, vinyl isobutyrate, vinyl pimelate, vinyl butyrate, vinyl 2-ethyl hexanoate, vinyl propionate and vinyl benzoate. However, since the water-soluble ethers of this invention are most economically prepared from the ethylene/vinyl acetate interpolymers, their employment is preferred.

The molecular proportions of ethylene to vinyl organic ester in the interpolymer subjected to hydrolysis and subsequent etherification may vary within wide limits depending upon the properties desired in the polymeric ether product. It is to be understood, however, that the mol ratio of ethylene to vinyl organic ester in said interpolymer should be not greater than 8/1 in order to provide ethers having appreciable water-solubility.

Hydrolysis of the interpolymer of ethylene and a vinyl organic ester is preferably effected in the manner described in U. S. application Serial No. 446,114 filed June 6, 1942. The extent to which said interpolymer must be hydrolyzed in order to permit the production of ethers having satisfactorily high water-solubility will vary within relatively wide limits, depending upon the vinyl organic ester in the interpolymer, the ratio of ethylene to vinyl organic ester, the degree of etherification of the hydrolyzed interpolymer and the etherification agent employed, and the use requirements of the resultant ether. However, in order to provide water-soluble products said interpolymer should be at least 50% hydrolyzed, i. e., at least 50% of the ester groups in said interpolymer should be replaced by hydroxyl groups. In most instances the maximum advantages of this invention are obtained when the interpolymer subjected to etherification is substantially completely hydrolyzed, i. e., from 95% to 100% of the ester groups are replaced by hydroxyl groups.

The polyalcohols obtained by hydrolysis of the aforementioned vinyl ester interpolymers contain aliphatic hydroxyl groups and not phenolic groups. Upon etherification in accordance with this invention with an alkylene oxide containing not more than 6 carbon atoms and having the general formula

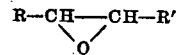

wherein R and R' are radicals selected from the group consisting of hydrogen atoms and monovalent alkyl, hydroxy alkyl and halogen alkyl radicals containing not more than 4 carbon atoms, there is obtained a hydroxyalkyl ether, hydroxyl radicals of the hydrolyzed interpolymer being replaced by monovalent radicals having the general formula

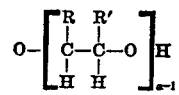

wherein R and R' are radicals selected from the group consisting of hydrogen atoms and alkyl, hydroxy alkyl and halogen alkyl radicals containing not more than 4 carbon atoms, a—1 is a positive integer and each

unit contains not more than 6 carbon atoms. The reactions involved in the aforementioned process are represented below. For convenience of illustration the reactions are presented for etherification of a completely hydrolyzed ethylene/vinyl organic ester interpolymer with ethylene oxide in the presence of sodium hydroxide.

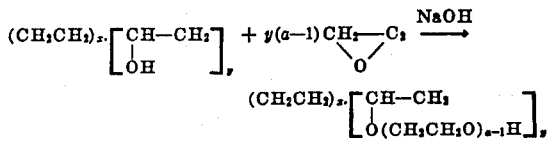

In this equation $x$ and $y$ are integers whose size depend upon the molecular weight of the interpolymer and the relative amounts of ethylene and vinyl organic ester (hydrolyzed) present. The molar ratio of ethylene to vinyl ester represented in the interpolymer is $x/y$. Also, in this equation, $a-1$ is a number representing the average unit length of the chain of $CH_2CH_2O$ units. The unit length of individual chains may vary; it may be zero or it may be a positive integer as high as 50 or more, i. e., some hydrolyzed groups may not be etherified at all, while other hydrolyzed groups may be etherified by chains containing as many as 50 or more $CH_2CH_2O$ units. However, the average unit length of said chains, including those which may have a unit length of zero, is a positive number represented by $a-1$.

In the production of hydroxy alkyl ethers the mol ratio of ethylene to vinyl organic ester in the interpolymer subjected to hydrolysis and etherification should be not greater than 8/1, and preferably should not be less than 1/25. When said mol ratio is within the range of from 1/25 to 8/1 the hydroxyalkyl ethers produced have optimum properties of water solubility, wetting, and emulsifying power. Hydroxyalkyl ethers of hydrolyzed vinyl organic ester interpolymers in which said ratio is greater than 8/1 form cheesy, difficultly water-soluble polymers. Compositions in which this ratio is less than 1/25 exhibit reduced wetting and emulsifying properties.

The properties of the hydroxyalkyl ether may be varied widely, depending upon the extent to which the ethylene/vinyl organic ester interpolymer is hydrolyzed prior to etherification thereof. In general, the more highly hydrolyzed the interpolymer, the greater the water-solubility of the resultant ether. When the mol ratio of ethylene to vinyl organic ester in the interpolymer is as high as about 8/1 said interpolymer should be substantially completely hydrolyzed prior to etherification, whereas when said mol ratio is as low as about 1/25 water-soluble hydroxyalkyl ethers may be had from interpolymers in which the degree of hydrolysis is as low as 50%, i. e., in which only 50% of the ester groups in the interpolymer are replaced by hydroxyl groups.

As hereinbefore stated the etherifying agent employed for the production of hydroxyalkyl ethers is an alkylene oxide containing not more than 6 carbon atoms and having the general formula

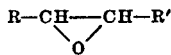

wherein R and R' are radicals selected from the group consisting of hydrogen atoms and monovalent alkyl, hydroxy alkyl and halogen alkyl radicals containing not more than 4 carbon atoms. Examples of suitable alkylene oxides adapted for use in this invention are: ethylene oxide, propylene oxide, butylene oxide, epichlorhydrin, glycidol. The preferred alkylene oxide, because of the superior results obtained therefrom, is ethylene oxide.

The properties of these hydroxyalkyl ethers of hydrolyzed ethylene/vinyl organic ester interpolymers can be adjusted further by controlling the average number of alkylene oxide molecules combined with each hydroxyl group, i. e., the value of $a-1$ in the above equation. Although $a-1$ may vary from 1 to very large numbers, in the preferred compositions $a-1$ varies from 1 to 30. For compositions in which the ratio of $x$ to $y$ in the above equation, i. e., the mol ratio of ethylene to vinyl ester in the interpolymer, is large, i. e., around 8/1, water solubility can be increased by an increase in the value of $a-1$. Hydroxyalkyl ethers of hydrolyzed ethylene/vinyl organic ester interpolymers that contain an average of less than one alkylene oxide group per hydroxyl group, i. e., when $a-1$ is less than 1, are difficultly water-soluble. Increasing the average number of alkylene oxide molecules combined with each hydroxyl group to a value greater than 30 does not appreciably increase water solubility.

The reaction between the hydrolyzed interpolymer and alkylene oxide is preferably effected in the presence of an alkali metal hydroxide, e. g., an aqueous sodium hydroxide solution. The amount of alkali metal hydroxide employed is relatively small, being an amount within the range of from about 0.2% to about 0.5% based on the weight of the alkylene oxide. While any alkali metal hydroxide may be used in my process I prefer, on account of economic considerations and the superior products had therewith, to employ sodium hydroxide.

The etherification reactions of this invention may be carried out in a variety of reaction chambers, the nature of which is not a part of this invention. It is, however, important that adequate agitation and temperature control be maintained. Preparations involving the use of alkylene oxides require equipment capable of withstanding superatmospheric pressures. The reaction is preferably effected at a temperature within the range of from 30° C. to 120° C. since products having optimum properties are thereby obtained. However, higher temperatures of up to 200° C. may be employed, in which case the reaction time is reduced.

The hydroxyalkyl ethers of hydrolyzed ethylene/vinyl organic ester interpolymers of this invention are useful as a new class of polymeric materials. Said ethers are useful in film form as wrapping foils. They also find application as detergents, textile sizes, emulsifying agents, as assistants for long chain aliphatic sulfonates in laundering, and as plasticizers for cellulose acetate.

As many apparently widely different embodiments of this invention may be made without departing from the spirit and scope thereof, it is to be understood that I do not limit myself to the specific embodiments thereof except as defined in the appended claims.

Having described the present invention, the following is claimed as new and useful:

1. A water-soluble hydroxyalkyl ether of a hydrolyzed interpolymer of ethylene and vinyl acetate, said ether being that had by replacing by hydroxyl groups at least 50% of the acetate groups of an interpolymer of ethylene and vinyl acetate in which the mol ratio of ethylene to vinyl acetate is within the range of from 1/25 to 8/1, and replacing the hydroxyl groups of the resultant hydrolyzed interpolymer by radicals having the general formula

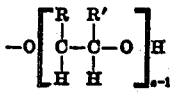

wherein R and R' are radicals selected from the group consisting of hydrogen atoms and monovalent alkyl radicals containing not more than 4 carbon atoms, each

unit contains not more than six carbon atoms, and $a$ is a positive integer, the average value of the numbers represented by $a-1$ in said ether being a positive number within the range of from 1 to 30.

2. A water-soluble hydroxyalkyl ether of a hydrolyzed interpolymer of ethylene and vinyl acetate, said ether being that had by replacing by hydroxyl groups at least 50% of the acetate groups of an interpolymer of ethylene and vinyl acetate in which the mol ratio of ethylene to vinyl acetate is within the range of from 1/25 to 8/1, and replacing the hydroxyl groups of the resultant hydrolyzed interpolymer by radicals having the general formula $-O(CH_2CH_2O)_{a-1}H$, wherein $a$ is a positive integer, the average value of the numbers represented by $a-1$ in said ether being a positive number within the range of from 1 to 30.

3. A water-soluble hydroxyalkyl ether of a hydrolyzed interpolymer of ethylene and vinyl acetate, said ether being that had by replacing by hydroxyl groups at least 95% of the acetate groups of an interpolymer of ethylene and vinyl acetate in which the mol ratio of ethylene to vinyl acetate is within the range of from 1/25 to 8/1, and replacing the hydroxyl groups of the resultant hydrolyzed interpolymer by radicals having the general formula $-O(CH_2CH_2O)_{a-1}H$, wherein $a$ is a positive integer, the average value of the numbers represented by $a-1$ in said ether being a positive number within the range of from 1 to 30.

4. The process of preparing a water-soluble hydroxy-alkyl ether of a hydrolyzed interpolymer of ethylene and vinyl acetate, which comprises admixing, at a temperature within the range of from 50° C. to 200° C., an alkylene oxide containing not more than 6 carbon atoms and having the general formula

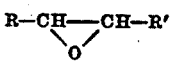

wherein R and R' are radicals selected from the group consisting of hydrogen atoms and monovalent alkyl radicals containing not more than 4 carbon atoms, with from 0.2% to 0.5% of an alkali metal hydroxide based on the weight of the alkylene oxide and a hydrolyzed interpolymer of ethylene and vinyl acetate, said hydrolyzed interpolymer being that had by replacing by hydroxyl groups at least 50% of the acetate groups of an interpolymer of ethylene and vinyl acetate in which the mol ratio of ethylene to vinyl acetate is within the range of from 1/25 to 8/1.

5. The process of preparing a water-soluble hydroxyalkyl ether of a hydrolyzed interpolymer of ethylene and vinyl acetate, which comprises admixing ethylene oxide and from 0.2% to 0.5% of an alkali metal hydroxide based on the weight of the ethylene oxide, at a temperature within the range of from 50° C. to 120° C., with a hydrolyzed interpolymer of ethylene and vinyl acetate, said hydrolyzed interpolymer being that had by replacing by hydroxyl groups at least 50% of the acetate groups of an interpolymer of ethylene and vinyl acetate in which the mol ratio of ethylene to vinyl acetate is within the range of from 1/25 to 8/1.

6. The process of preparing a water-soluble hydroxyalkyl ether of a hydrolyzed interpolymer of ethylene and vinyl acetate, which comprises admixing ethylene oxide and an amount of aqueous sodium hydroxide solution equivalent to from 0.2% to 0.5% of sodium hydroxide based on the weight of the ethylene oxide, at a temperature within the range of from 50° C. to 120° C. with a hydrolyzed interpolymer of ethylene and vinyl acetate, said hydrolyzed interpolymer being that had by replacing by hydroxyl groups at least 95% of the acetate groups of an interpolymer of ethylene and vinyl acetate in which the mol ratio of ethylene to vinyl acetate is within the range of from 1/25 to 8/1.

7. The process of preparing a water-soluble hydroxyalkyl ether of a hydrolyzed interpolymer of ethylene and vinyl acetate which comprises admixing an alkylene oxide containing not more than six carbon atoms and having the general formula

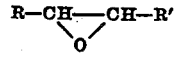

wherein R and R' are radicals of the group consisting of hydrogen atoms and monovalent alkyl radicals containing not more than four carbon atoms, with an alkali metal hydroxide and a hydrolyzed interpolymer of ethylene and vinyl acetate, said hydrolyzed interpolymer being that had by replacing by hydroxyl groups at least 50% of the acetate groups of an interpolymer of ethylene and vinyl acetate in which the mole ratio of ethylene to vinyl acetate is within the range of from 1/25 to 8/1.

WILLIAM H. SHARKEY.

REFERENCES CITED

The following references are of record in the file of this patent:

UNITED STATES PATENTS

| Number | Name | Date |
|---|---|---|
| 2,200,429 | Perrin | May 14, 1940 |
| 1,971,662 | Schmidt | Aug. 28, 1934 |

Certificate of Correction

Patent No. 2,434,179.   January 6, 1948.

WILLIAM H. SHARKEY

It is hereby certified that errors appear in the printed specification of the above numbered patent requiring correction as follows: Column 5, line 64, for the word "his" read *this*; column 8, line 46, for "30° C." read *50° C.*; and that the said Letters Patent should be read with these corrections therein that the same may conform to the record of the case in the Patent Office.

Signed and sealed this 8th day of June, A. D. 1948.

[SEAL]

THOMAS F. MURPHY,
*Assistant Commissioner of Patents.*